No. 648,719. Patented May 1, 1900.
J. C. ANDERSON.
ENGINE.
(Application filed Nov. 28, 1899.)
(No Model.) 8 Sheets—Sheet 1.

WITNESSES:
J. G. Booth.
Edwin L. Bradford.

INVENTOR
Jas. C. Anderson
BY
ATTORNEYS

No. 648,719. Patented May 1, 1900.
J. C. ANDERSON.
ENGINE.
(Application filed Nov. 28, 1899.)
(No Model.) 8 Sheets—Sheet 5.

Fig. 5.

WITNESSES:
Edwin L. Bradford

INVENTOR
Jas. C. Anderson
BY
Wm. Cruikshank
ATTORNEY

No. 648,719. Patented May 1, 1900.
J. C. ANDERSON.
ENGINE.
(Application filed Nov. 28, 1899.)
(No Model.) 8 Sheets—Sheet 8.

UNITED STATES PATENT OFFICE.

JAMES C. ANDERSON, OF HIGHLAND PARK, ILLINOIS.

ENGINE.

SPECIFICATION forming part of Letters Patent No. 648,719, dated May 1, 1900.

Application filed November 28, 1899. Serial No. 738,613. (No model.)

*To all whom it may concern:*

Be it known that I, JAMES C. ANDERSON, a citizen of the United States, residing at Highland Park, in the county of Lake and State of Illinois, have invented certain new and useful Improvements in Engines; and I do hereby declare the following to be a full, clear, and exact description of the invention, such as will enable others skilled in the art to which it appertains to make and use the same.

My invention relates to certain new and useful improvements in engines, and constitutes a modification in construction of that type of engines illustrated and described in another application (Case A) filed by me on the 10th day of October, 1899, Serial No. 733,189. In the application referred to I have shown and described a cylindrical piston having a reciprocating and oscillating movement with a radial arm extending from its periphery in such a manner that the resolution of the reciprocating and oscillating movements of the piston will cause the radial arm at its juncture with the piston to traverse a circle the diameter of which is equal to the distance the piston moves in either its reciprocating or oscillating movement, which two movements are secured through the medium of steam delivered alternately at each end of the piston and also alternately on each side of a radial wing extending from the periphery of the piston and diametrically opposite to the radial arm referred to, whereby rotary motion may be communicated to the driving-shaft without having to overcome dead-centers by the employment of a fly-wheel. My present invention involves the same generic principle of delivering power and motion to the driving-shaft and utilizing the entire force of the motive agent, which may be steam, compressed air, or any equivalent body; but to avoid any confusion of terms I will describe my improved engine as adapted for use with steam at full boiler-pressure.

My invention consists in the construction, combination, and arrangement hereinafter fully set forth.

In order that those skilled in the art to which my invention appertains may know how to make and use the same, I will proceed to describe the construction and operation, referring by letters and numerals to the accompanying drawings, in which—

Similar letters and numerals of reference denote like parts in the several figures of the drawings.

A is the bed of the engine.

B is the cylinder of what I denominate as the "driving-piston," and B' is the cylinder of the auxiliary piston. The two cylinders are for the purpose of avoiding confusion of lines in the drawings shown as cast integral with each other and the bed-plate; but it will be understood that they may be cast in sections and subsequently joined in any manner well known to founders and machinists.

C represents the heads of cylinder B, secured to the flange of the latter by bolts D, and C' represents the heads of the cylinder B', secured to the flanges of said cylinder by bolts D'.

E is the driving-piston, located within the cylinder B, and E' is the auxiliary piston, located within the cylinder B'. Both pistons are formed with closed heads, as shown, and the driving-piston E is formed with two diametric interior nipples or reinforces F F', the former to receive a screw-threaded radial driving-arm G, held against axial rotation by a jam-nut G', and the latter rib F' to receive a radial connecting-arm H, held against axial rotation by a jam-nut H'. The auxiliary piston is formed with an interior nipple or reinforce I, adapted to receive a connecting radial arm I', the radial arms H and I' being connected in any suitable manner by a separable universal compensating joint J J'.

Transverse to the reinforce-nipples each piston is formed with diametrically-arranged longitudinal steam-passages closed at their interior ends and leading out at the opposite heads of the pistons, as clearly shown.

As will be seen by reference to the drawings, the driving-piston E and its cylinder B are arranged vertically upon the bed A, and the auxiliary piston E' and its cylinder B' are arranged horizontally and at right angles to the driving-cylinder and its piston and a suitable distance therefrom to constitute a well or space L for the movement of the connecting-arms H and I'. One or more sides of this well are open to afford access to the arms H I' and their compensating joint and are closed by plates L', secured in an obvious manner by screw-bolts M. The driving-piston cylinder B is formed with a circular well M', which is closed by a cap N, secured in place by screw-bolts N'. This cap is formed with journal-boxes O, in which is supported the driving-shaft O', connected with the radial arm G of the driving-piston through the medium of a crank P and universal compensating joint P' or in any other suitable manner to convert the compound curvilinear or undulating curved motion of the arm G into the rotary motion of the driving-shaft O', as fully set forth in the pending application hereinbefore referred to. The well M thus closed constitutes not only a space within which the arm G and crank may move, but also a receptacle for the lubricant used in connection therewith. The driving-shaft may be provided with suitable collars each side of the boxes O to secure it against longitudinal movement, and any suitable packing or stuffing box may also be used.

Figure 3:
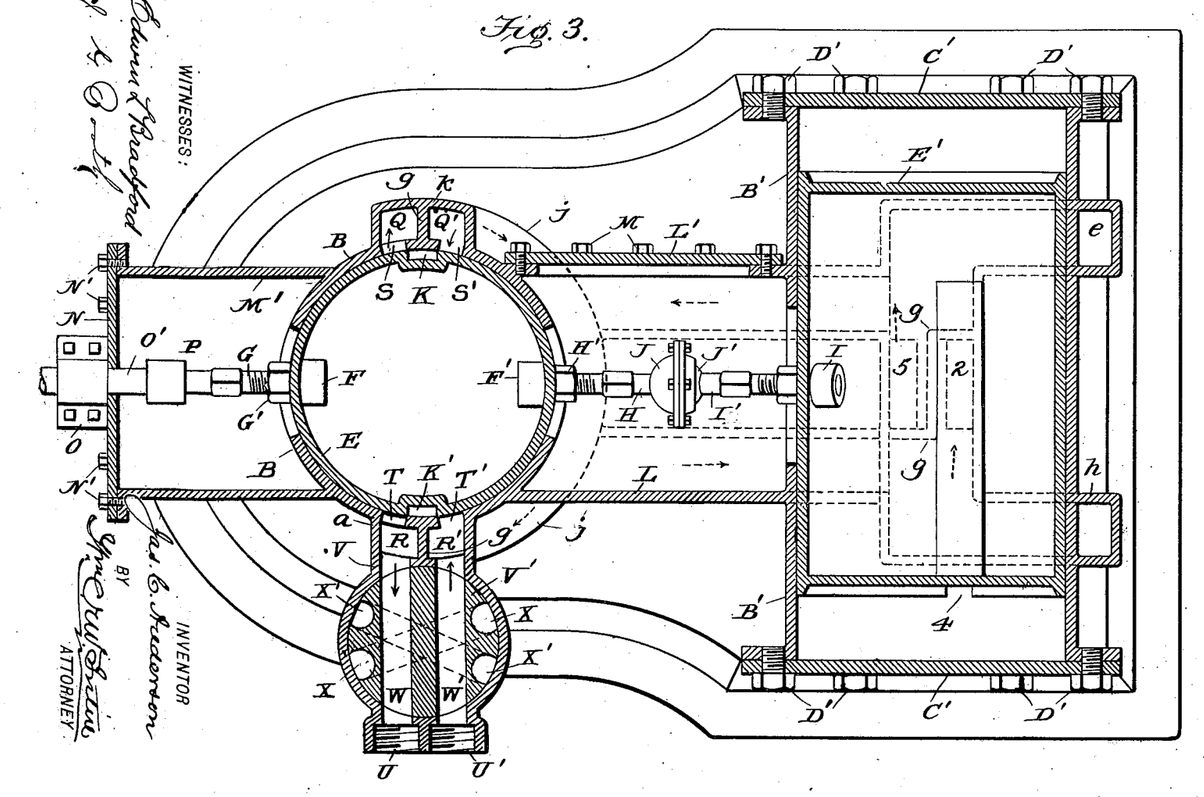
Fig. 3 is a central horizontal section on the line $y\ y$ of Fig. 1 with the parts in the same relation.
Figure 5:
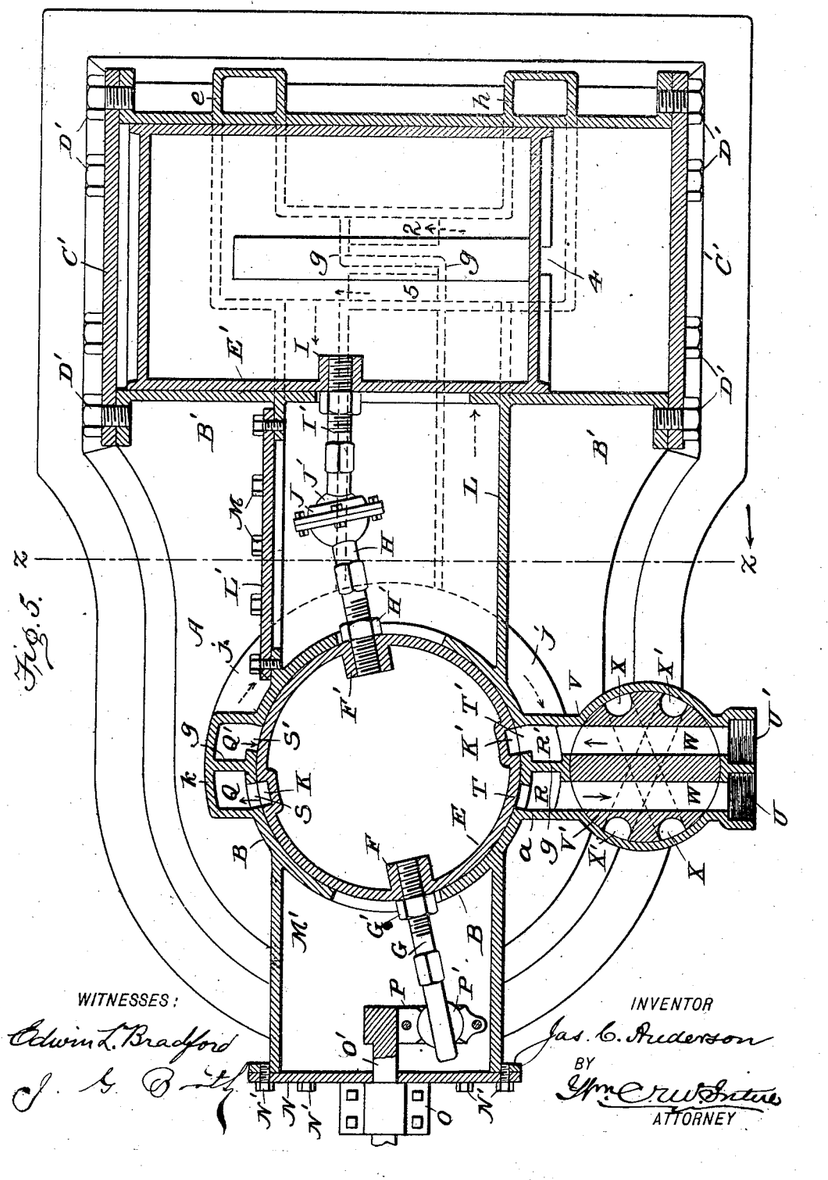
Fig. 5 is a section on the same line as Fig. 3, but with the ports in the relation described with reference to Fig. 4.
Figure 7:
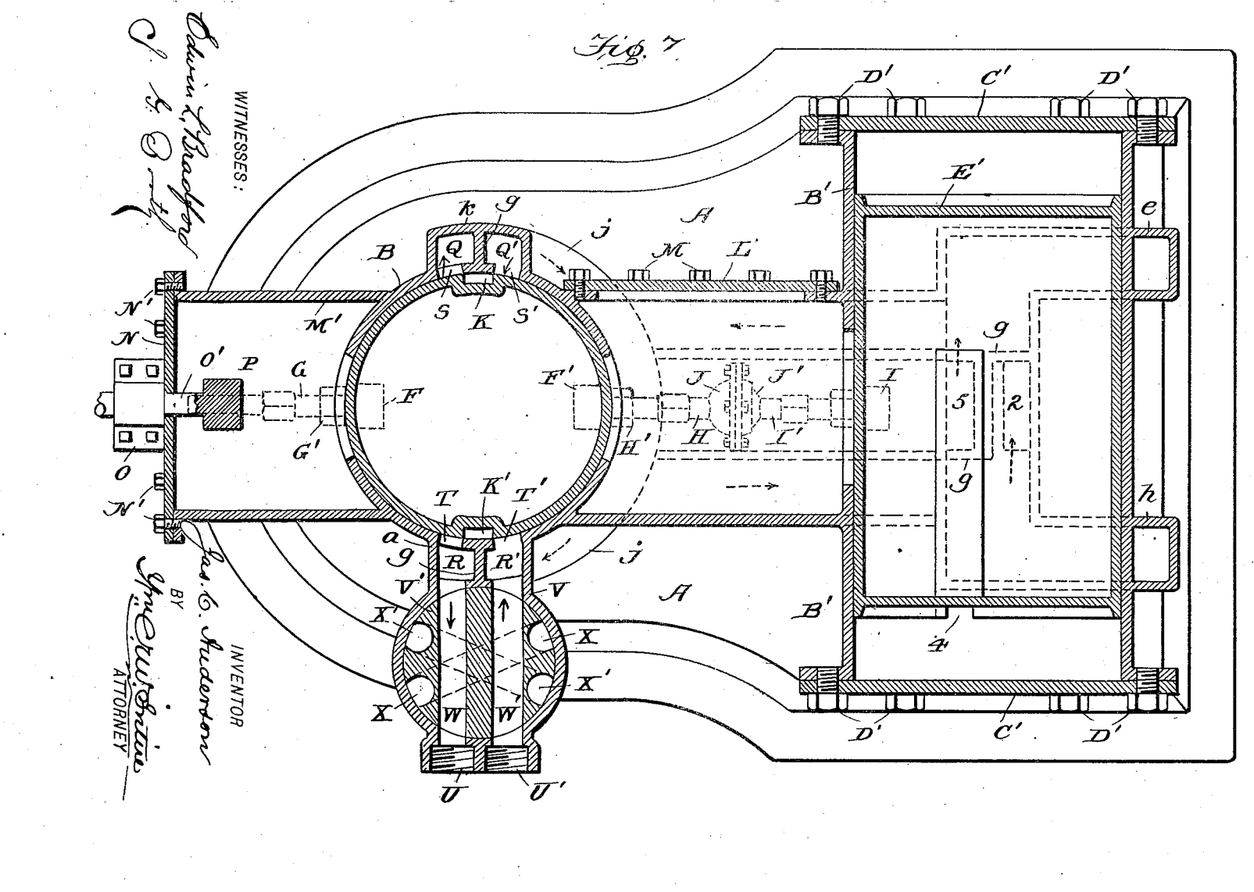
Fig. 7 is a section on the same line as Fig. 3, but with the parts in the relation shown in Fig. 6.
Figure 8:
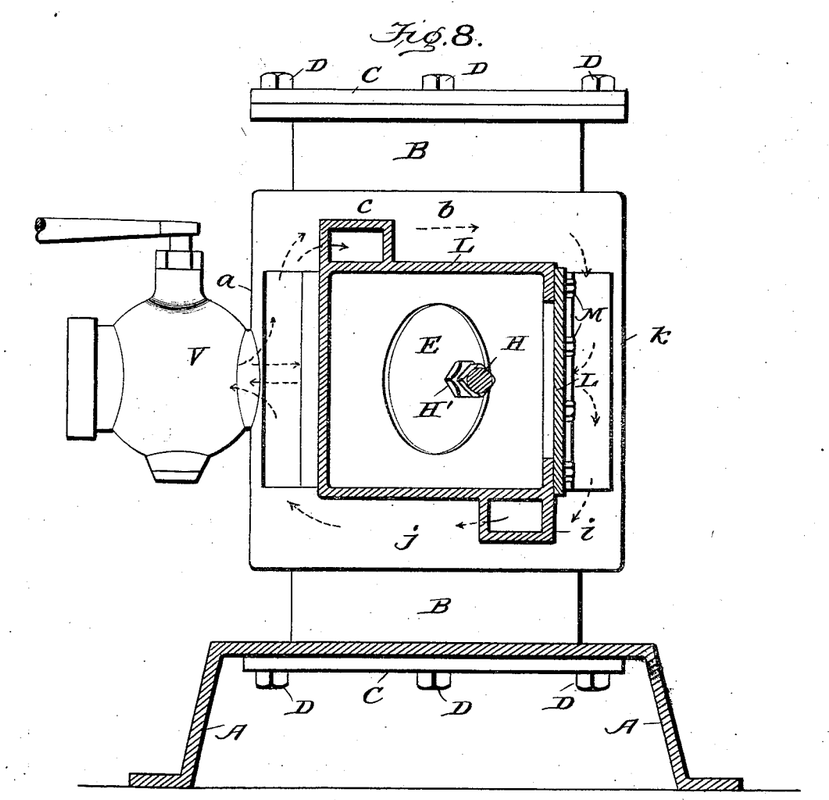
Fig. 8 is a vertical section taken at the line $z\ z$ of Fig. 5 looking in the direction of the arrow.

The cylinder or casing B is formed with longitudinal steam-passages Q Q' and R R' diametrically opposite to each, respectively, and with ports S S' and T T', which alternately communicate with the longitudinal steam-passages K and K', respectively, of the cylindrical piston E, as best shown at Figs. 3, 5, and 7. The ports S S' and T T' are equal in length to the extreme reciprocating movement of the piston E, so that live steam is supplied at the head of the piston until the moment when the said piston is oscillated, as presently described, upon an imaginary longitudinal axis, whereupon the steam is cut off, and after the oscillation has been completed the steam is admitted to the longitudinal steam-passage on the opposite side of the piston, and consequently as it enters between the opposite end of the piston and head of the cylinder the former is reciprocated in the reverse direction.

The longitudinal steam-passages Q Q' and R R' are separated by a longitudinal wall or partition, as clearly shown at Figs. 3, 5, and 7 and 2, 4, and 6, and the cylindrical wall of the casing between such passages extends either side of said partition, as clearly shown, to constitute an efficient cut-off between said two passages. The steam-passages R and R' in the piston-casing B communicate with inlet and outlet passages U and U' of a radial extension V, formed with a vertical valve-seat, in which is located a valve V', with four-way steam-passages W and W' and X and X'. The two former are parallel with each other and communicate directly with the inlet U and outlet U', respectively, and the latter X and X' may be turned so that X will establish communication between the inlet U and the passage R and conduct live steam thereto, while X' will establish communication between the passage R' and the outlet U', and consequently the passages R and R' may be employed either to conduct live steam or to exhaust the dead steam, and in this way the engine may be readily reversed.

In normal condition, as shown at Fig. 3, the valve is arranged with the passages W and W' in alinement with the inlet U and outlet U', respectively, as shown.

Figure 2:
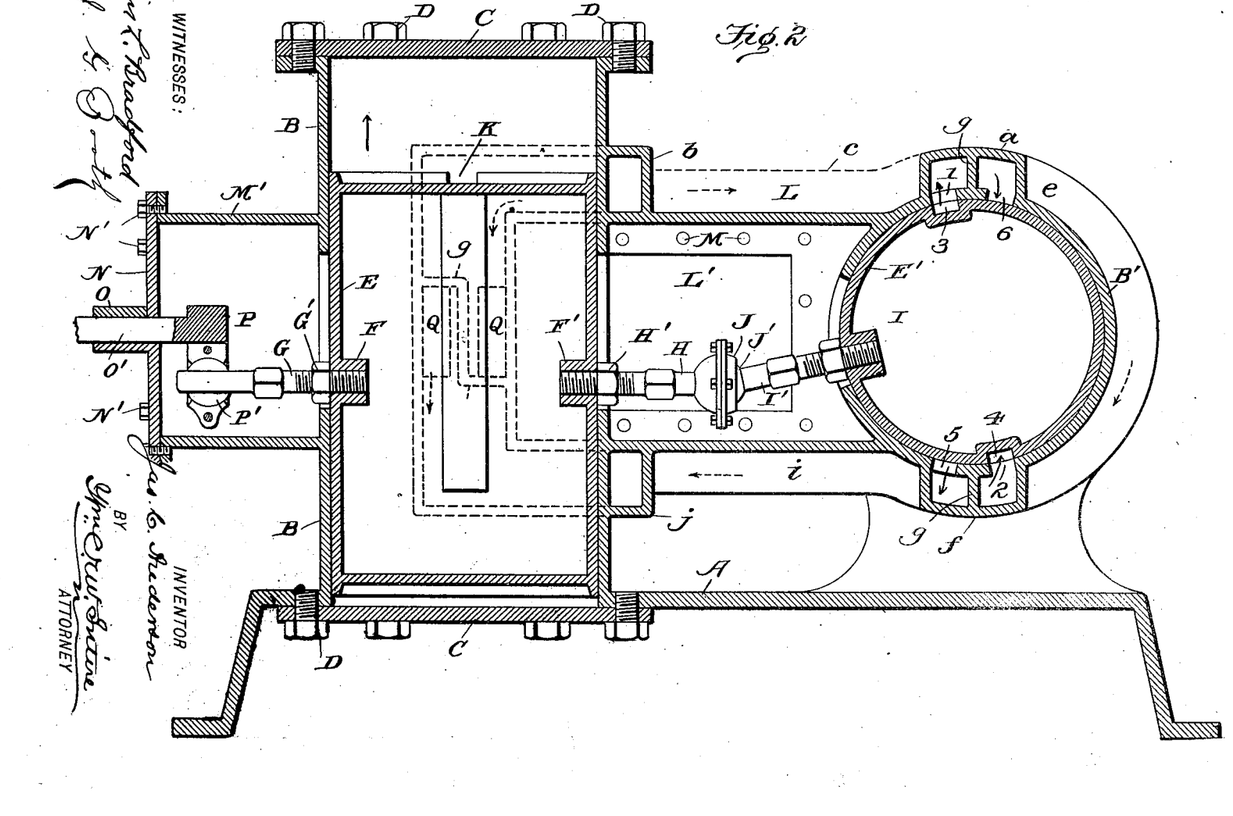
Fig. 2 is a vertical central section on the line $x\ x$ of Fig. 1 and showing the driving-piston at rest or at an imaginary starting-point.
Figure 4:
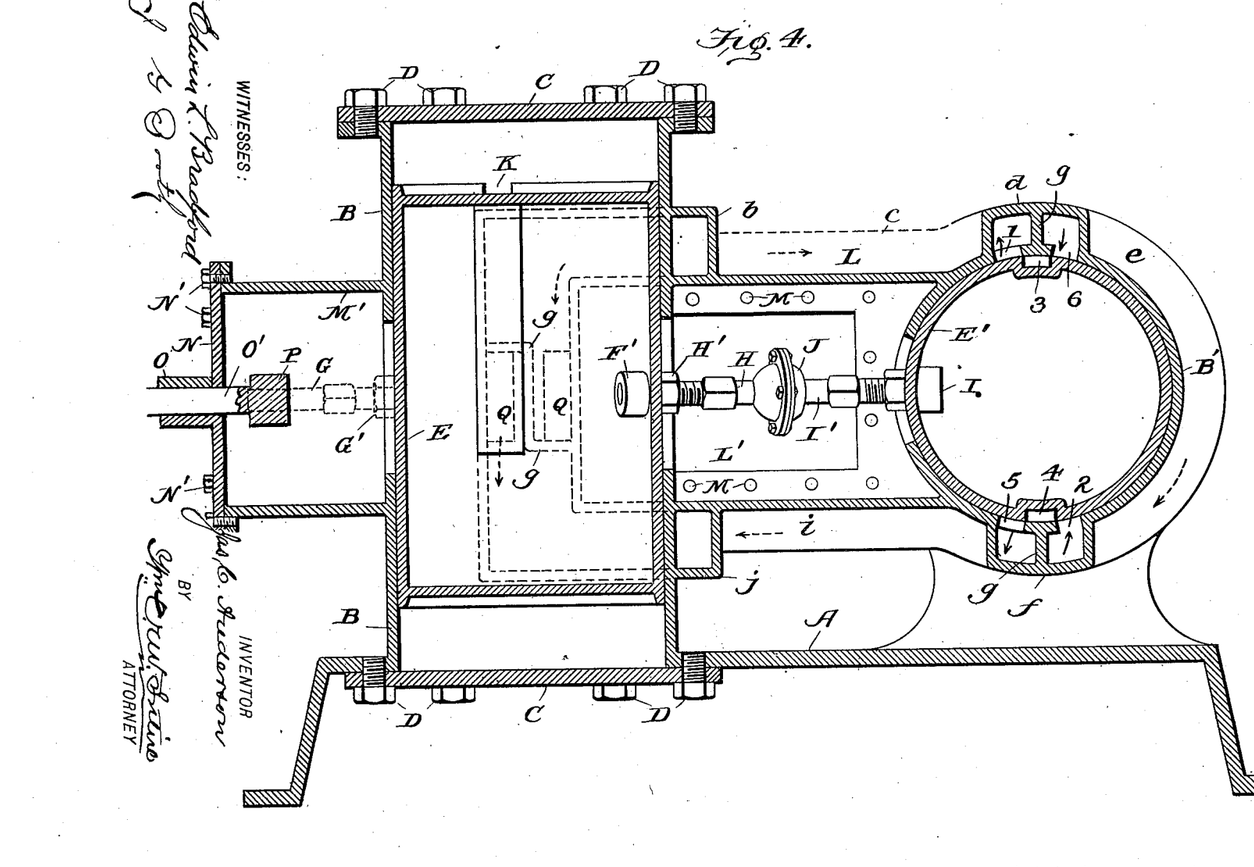
Fig. 4 is a section similar to Fig. 2, but showing the pistons and ports in the position and relation occupied when the driving-piston has made one-fourth of both its reciprocating and its rotative or oscillating movement.
Figure 6:
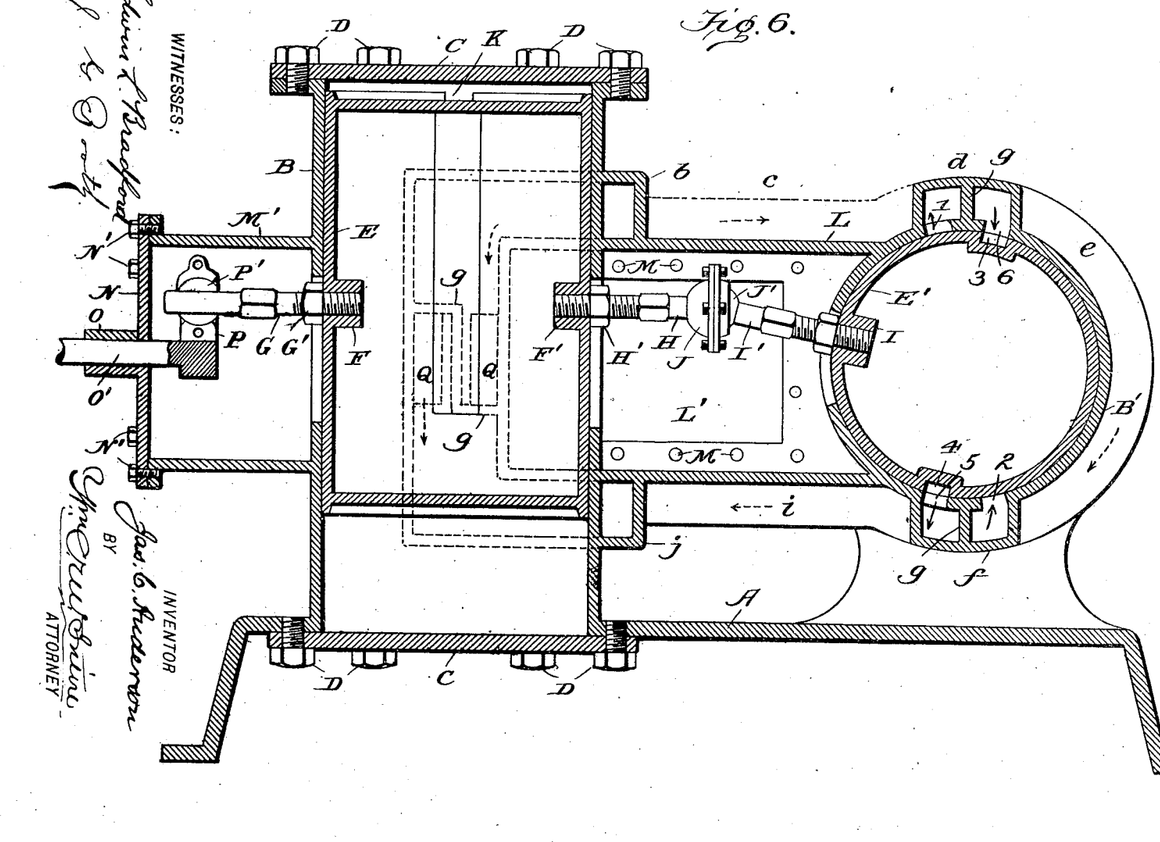
Fig. 6 is a central section on the same line of Fig. 2, but showing the pistons and ports in the position and relation occupied when the driving-piston has made one-half of a complete stroke.

In describing the steam-passages and the movements of the two pistons E and E' relatively to each other especial reference is made to the fact that in the drawings the changes in relation are shown in Figs. 2, 3, 4, 5, 6, and 7, Figs. 2 and 3 representing one relation of the parts, Figs. 4 and 5 another, and Figs. 6 and 7 still another. Assuming the engine to be in a state of rest, as shown at Figs. 2 and 3, with the inlet U and outlet U' registering, respectively, with the passages W and W' of the valve V' and with the passages R and R', the passages K and K' are closed by the wall of the casing B and the ports S S' and T T' are also closed, and the piston E is represented as having reached the position shown at Fig. 2, the auxilliary piston E' having reached the position shown at Fig. 3, with the ports 1 2 of the cylinder B' registering with the longitudinal passages 3 4 on opposite sides of the cylinder. Steam being admitted through the inlet U passes through the passage W' of the valve to the passage R' of the cylinder B, thence upwardly through *a* into the communicating channel in a semicircumferential enlargement *b*, thence around to the opposite side of the cylinder, and down a vertical passage similar to *a*. The live steam also traverses through a channel or duct in a bridge *c* to a channel in the longitudinal enlargements *d* and direct through the port 1 to the longitudinal channel 3 in the side of the piston E' and out said channel and between the head of the piston and the head of the cylinder B'; driving the piston in the direction shown by the arrow in Fig. 2 at the same time the live steam passes along *d* to the channel in the semicircumferential enlargement *e* to the duct in the longitudinal enlargement *f* opposite to *d*. Before further tracing the traverse of the steam and the way in which it is exhausted it is well to state at this point that both cylinders are alike in the arrangement of the longitudinal and circumferential enlargements and the steam passages or ducts therein, and, as will be seen by reference to the dotted lines in Figs. 2, 3, 4, 5, 6, and 7, a wall *g* divides or separates the space or duct in each of the longitudinal enlargements into two compartments, so that they may communicate alternately through the ports (also shown in dotted lines) with the longitudinal steam passages formed in the sides of the respective pistons—viz., K and K′ in the piston E and 3 and 4 in the auxiliary piston E′—the ends and longitudinal connecting portions of the wall *g* separating the ports in the steam-passages in the longitudinal extensions. I will now resume the traverse of the steam and the movement of the engine. When the steam at the head of the auxiliary piston E causes the same to move in its longitudinal direction, the connection between the periphery of said piston and the driving-piston (consisting of the arms H I′ and joint J J′) causes the driving-piston E to begin its rotation on its imaginary longitudinal axis, bringing the longitudinal steam-channel K′ gradually into register with the port R′, thus admitting steam between the lower head of the piston and the head of the cylinder, thus starting said piston in the upward movement of its stroke, which continues until the limit of such movement is reached, and at the same time the auxiliary piston has traveled to the end of the movement started by the admission of steam through the port 1 to the passage 3, as already described, and through the connection between the peripheries of the piston it has been oscillated or rotated upon its imaginary axis, thus closing the port 1 and shutting off the steam from the longitudinal passage 3, and at the same time opening the communication between the port 5 and the longitudinal passage 4 on the opposite side of the piston. This action delivers steam in an obvious manner to the opposite head of the piston and causes it to reciprocate or travel in the opposite direction. It will be seen that under the relations of the pistons and their relative movements when one piston has completed a full stroke the other has made only a half-stroke, and vice versa, so that the radially-extended arms H and I′, connected by a universal compensating joint, produced the rotative or oscillating motion of each piston to open and close the respective ports at the proper time, and as these movements are gradual and the movements of the respective pistons in their longitudinal reciprocations are such as described it will be apparent that there are no dead-centers to overcome and that the engine can be started at any point by admitting steam and likewise be stopped by shutting off the steam. It will also be seen that the radial compensating connection between the two pistons not only effects and controls the rotative action of both pistons, but also controls or prevents any shock at the completion of reciprocation and oscillation in either direction, thus securing an even and noiseless action and preventing the wear and disarrangement of parts which would ensue if such momentum shocks occurred.

Thus far I have described the course and action of the steam in giving the necessary movements to the piston, and I will now describe the course of the exhaust or dead steam alternately at each end of the respective cylinders.

Figure 1:
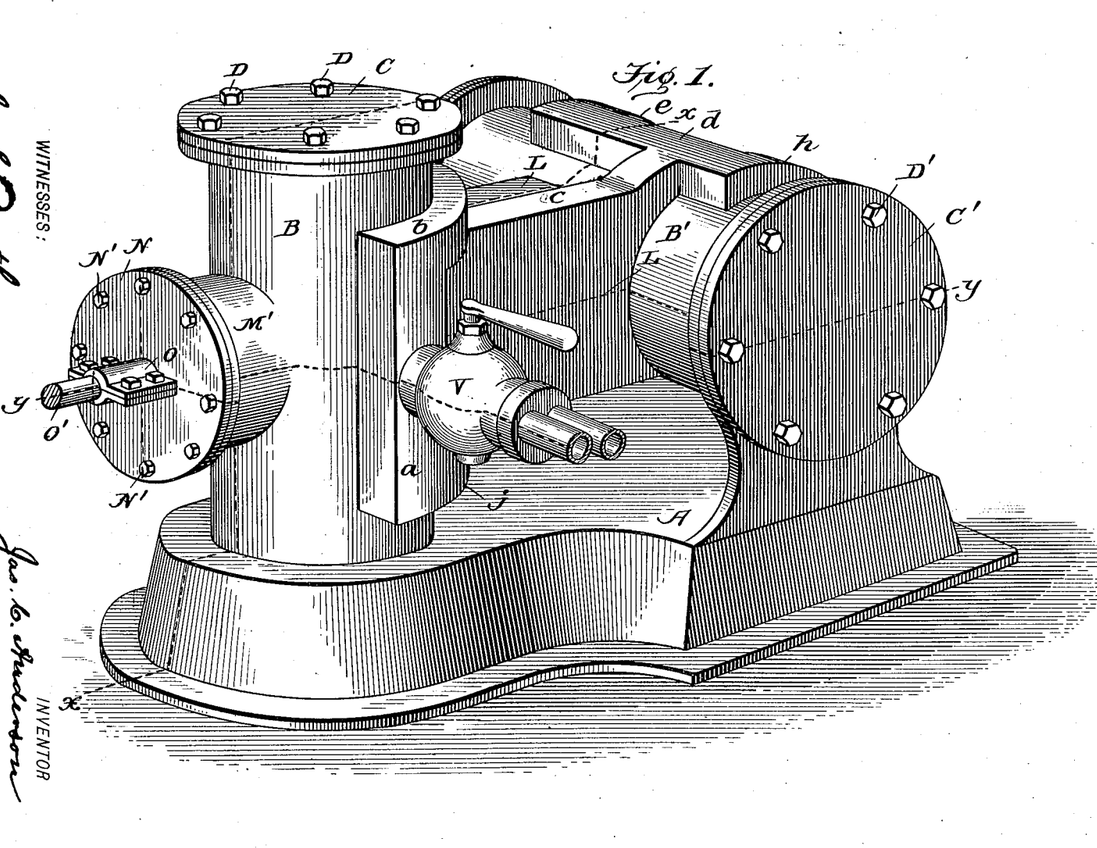
Figure 1 is a perspective view of one of my improved engines.

When the auxiliary piston E′ has reached the limit of the movement in the direction given it by admitting steam to the head of the piston through the port 1, as described, and said piston has been oscillated through its radial connection with the driving-piston E, the port 1 is closed by the face or periphery of the piston and the steam-channel 3 is brought into register with the port 6 of the steam-duct of the longitudinal enlargement *d* on the cylinder B′, and at the same time the steam-channel 4 on the opposite side of the piston has been brought into register with the port 5, as already explained, and as the port 5 opens into the channel in the longitudinal enlargement *d* on the opposite side of the wall *g* it becomes the live-port through which steam is admitted from the passage in the longitudinal enlargement *f* and thence to the opposite head of the cylinder, and the dead steam is exhausted through the port 6 into the channel in the enlargement *d*, thence down a channel in a semicircumferential enlargement *h*, similar to *e*, to a duct in a bridge *i*, connecting *h* with the semicylindrical enlargement *j* on the cylinder B, and thence to a longitudinal passage Q in an enlargement *k* opposite to the enlargement *a* and communicating with the exhaust-port S, thence through the channel in the semicircumferential enlargement *j* to the passage R and through the outlet U, as indicated by the arrows in Fig. 1.

It will be understood from what has been said that both pistons are operated in precisely the same manner by the motive force and that, each being dependent upon the other for rotative action, there is absolute synchronism in this respect—in other words, rotative motion is given to one piston by the reciprocation of the other, and vice versa—and that, while the path described by the connecting-joint J J′ in a plane vertical between the peripheries of the two pistons is that of a circle, the transverse path of travel is sinuous or undulatory, owing to the fact that the ends of the arms H and I′ at their points of fixed relation with the respective pistons are constantly varying both horizontally and vertically from the absolute central plane in both directions between the two pistons. It will be understood that the driving-piston E is positively reciprocated by the direct action of the steam alternately upon its two ends at full boiler-pressure and that the rotative action of said cylinder is secured through the reciprocation of the auxiliary piston E' and also that the admission of steam alternately at each end of the piston E' to secure positive reciprocation of said piston is secured through its rotative action, imparted by the driving-piston E, the live steam traversing both cylinders and exhausting at a single exhaust-point. The engine may be reversed by simply conducting the steam in a reverse direction to that described.

On the piston E, diametrically opposite to the connecting-arm H, the radial arm G' connects, through the medium of a compensating joint, with the driving-shaft, as already described, and positive rotary motion is imparted to said shaft in the manner fully described in my pending application hereinbefore referred to.

What I claim as new, and desire to secure by Letters Patent, is—

1. An engine consisting of cylinders arranged transversely to each other upon a suitable bed and connected peripherally by a hollow connection, pistons arranged within the respective cylinders and adapted to reciprocating and rotative movement, and connected peripherally by rigid arms and a universal compensating joint, and arranged relatively to each other as described, whereby when the main or driving piston has made a half or full stroke, the auxiliary piston will have made a quarter or half stroke respectively, thus avoiding dead-centers and permitting the engine to be started or stopped at any point, substantially as hereinbefore set forth.

2. In an engine, a pair of cylinders mounted transversely to each other upon a bed, each provided with a cylindrical piston adapted to reciprocate and oscillate upon an imaginary longitudinal axis, and with their adjacent peripheries connected by rigid arms and a universal compensating joint, one of said pistons provided with a diametrically-arranged peripheral shaft adapted to be connected with a rotary driving-shaft, and suitable passages and ports for the admission and exhaust of the motive agent, alternately at each end of the respective pistons, whereby the reciprocating and rotative movement of each piston is controlled by the other and both coöperate in delivering power and motion to the driving-shaft, substantially as and for the purpose set forth.

3. An engine for transmitting reciprocating power and motion direct into rotary, consisting of two reciprocating pistons E and E' mounted transversely to each other within suitable cylinders and provided at their peripheral centers with projecting rigid arms connected by ball-and-socket joint whereby alternating and reciprocating motion is imparted to the pistons for opening and closing their respective ports and transmitting four-way positive motion into rotary motion by means of a rigid arm connected to one of the cylinders, said arm being provided with suitable compensating connection to a driving-shaft leading from the engine, substantially as and for the purpose set forth.

4. An engine for converting reciprocating motion into rotary motion and transmitting the same direct to the driving-shaft, consisting of a primary piston E provided with radial arms G and H and an auxiliary piston E' provided with a radial arm I', the arms H and I' connecting the cylinders by a ball-and-socket joint J and J', in combination with an arm P and driving-shaft O', the arms G and P being provided with an intermediate compensating joint, substantially as and for the purposes set forth.

5. An engine for transmitting reciprocating and oscillatory motion into rotary motion and power consisting of two operating-pistons arranged within suitable cylinders diametric and transverse to each other; each of said cylinders connected at their peripheries by rigid arms secured together by a universal joint, whereby the reciprocating and oscillatory motions of each of the cylinders are limited in their respective strokes and the motion transmitted rotarily by means of an auxiliary arm to the driving-shaft, substantially as described.

6. In an engine, the cylinders B and B' mounted upon a suitable bed and transversely to each other, with their adjacent peripheries connected by a suitable well-space L, and each provided with diametric longitudinal steam-passages separated by walls g and provided with ports S, S', T, T', and 1, 6, 2, 5, respectively, steam-passages leading from an inlet and exhaust to the several ports and pistons E and E', provided with longitudinal passages K, K', and 3, 4, respectively and having their peripheries centrally connected through the medium of short rigid arms and a universal compensating joint, substantially as and for the purpose set forth.

7. In combination with the twin cylinders and pistons constructed and arranged as described, the radial extension V, on the cylinder B, provided with inlet and outlet passages U, U' valve V with four-way steam-passages W, W', X, X' and means for operating the valve, whereby the engine may be reversed, substantially as hereinbefore set forth.

8. In combination with an initial rotary engine consisting of cylinder B and piston E, having a rotative and reciprocating movement, and a radial power-transmitting arm G and a diametric arm H, a secondary cylinder B' and auxiliary reciprocating and rotative piston E', having a radial arm I', said arm I' and the arm H on the piston E, connected by a universal compensating joint, and suitable inlet and outlet ports, for admitting the motive agent alternately at opposite ends of the pistons whereby the reciprocation of each piston causes the oscillation or partial rotation of the other to control the admission and exhaust of the motive agent, as and for the purposes described.

9. The cylinders B, B' joined peripherally by the well-space L, provided with removable plates L' and constituting lubricating-space for the connections between the pistons, substantially as hereinbefore set forth.

10. The cylinders B and B' mounted transversely and adjacent to each other, each provided with longitudinal and circumferential passages leading to diametric ports as described, the bridge-passages $c$, $i$, between the cylinders and the inlet and outlet passages W, W', and a suitable controlling-valve V', substantially as and for the purposes set forth.

11. In combination with the cylinders and pistons arranged transversely to each other and adapted to reciprocating and rotative movement, the peripheral connection consisting of rigid arms with their adjacent ends connected by a universal and compensating joint, whereby rotative action is imparted to each piston by the other and the reciprocating movement of each is limited to avoid momentum shocks, substantially as hereinbefore set forth.

12. In combination with the primary cylinder B and auxiliary cylinder B', and driving and auxiliary pistons E and E' connected by the arms H and I', the peripheral well M' having a cap N provided with boxes O to constitute bearings for the driving-shaft O', substantially as hereinbefore set forth.

In testimony whereof I affix my signature in presence of two witnesses.

JAMES C. ANDERSON.

Witnesses:
 J. G. BOOTH,
 JNO. J. HARROWER.